(12) United States Patent
Becker et al.

(10) Patent No.: US 7,690,973 B2
(45) Date of Patent: Apr. 6, 2010

(54) COMBINE CLEAN GRAIN ELEVATOR SYSTEM

(75) Inventors: Klaus E. Becker, East Moline, IL (US); Robert W. Hawkins, Rapids City, IL (US); Dan J. Burke, Cordova, IL (US); Jerry A. Sandau, Orion, IL (US); Bruce A. Coers, North Hillsdale, IL (US); Dohn Pfeiffer, Cordova, IL (US); Mark C. DePoorter, East Moline, IL (US)

(73) Assignee: Deere & Company, Moline, IL (US)

( * ) Notice: Subject to any disclaimer, the term of this patent is extended or adjusted under 35 U.S.C. 154(b) by 1 day.

(21) Appl. No.: 12/109,630

(22) Filed: Apr. 25, 2008

(65) Prior Publication Data
US 2009/0270147 A1    Oct. 29, 2009

(51) Int. Cl.
*A01D 17/02*    (2006.01)
(52) U.S. Cl. .................................... 460/114
(58) Field of Classification Search .......... 460/114, 460/13, 14; 414/526, 812; 198/668, 666
See application file for complete search history.

(56) References Cited

U.S. PATENT DOCUMENTS

| | | | | |
|---|---|---|---|---|
| 1,382,901 A | * | 6/1921 | Gebhardt | 209/321 |
| 3,580,257 A | * | 5/1971 | Teague | 460/102 |
| 3,760,813 A | | 9/1973 | Mathews | |
| 4,800,902 A | * | 1/1989 | Maust | 460/59 |
| 5,318,475 A | * | 6/1994 | Schrock et al. | 460/1 |
| 5,380,247 A | * | 1/1995 | Underwood | 460/114 |
| 5,443,352 A | * | 8/1995 | Schuhmacher | 414/526 |
| 5,496,215 A | * | 3/1996 | Underwood et al. | 460/114 |
| 5,498,206 A | * | 3/1996 | Underwood et al. | 460/14 |
| 5,863,247 A | * | 1/1999 | Behnke et al. | 460/6 |
| 6,102,795 A | * | 8/2000 | Behrens | 460/119 |
| 6,142,290 A | * | 11/2000 | Tagliaferri | 198/716 |
| 6,350,197 B1 | * | 2/2002 | Cooksey et al. | 460/114 |
| 6,669,558 B1 | * | 12/2003 | Wolters et al. | 460/14 |
| 6,974,384 B2 | * | 12/2005 | Schmidt | 460/114 |
| 7,452,180 B2 | * | 11/2008 | Talbi et al. | 414/812 |

FOREIGN PATENT DOCUMENTS

WO    0158247 A    8/2001

OTHER PUBLICATIONS

European Search Report dated Jul. 9, 2009, (5 pages).

* cited by examiner

*Primary Examiner*—Árpád Fábián-Kovács
(74) *Attorney, Agent, or Firm*—Taylor & Aust, P.C.

(57) ABSTRACT

A harvesting machine including a frame, a plurality of ground engaging wheels, at least one grain separating section, a plurality of cross augers and a grain moving device. The plurality of ground engaging wheels support the frame. The at least one grain separating section is supported by the frame. The plurality of cross augers are positioned to receive grain from the at least one grain separating section. The plurality of cross augers each have an end. The grain moving device is associated with each of the plurality of cross augers proximate to the end of the plurality of cross augers.

10 Claims, 4 Drawing Sheets

COMBINE CLEAN GRAIN ELEVATOR SYSTEM

FIELD OF THE INVENTION

The present invention relates to a harvester, and, more particularly to a clean grain elevator system associated with a harvester vehicle.

BACKGROUND OF THE INVENTION

A grain-harvesting combine includes a header, which cuts the crop and feeds it into a threshing rotor. The threshing rotor rotates within a perforated housing, performing a threshing operation of the grain from the crop directed thereinto. Once the grain is threshed it falls through perforations in the housing onto a grain pan. From the grain pan the grain falls through a set of upper and lower sieves. The sieves are vibrating or oscillating, causing clean grain to fall through for the purposes of collection. A blower blows air upward through the sieves, discharging chaff toward the rear of the combine. Crop residue such as straw from the threshing section proceeds through a straw chopper and out the rear of the combine.

The clean grain is gathered by a cross auger and taken to a clean grain elevator with the clean grain elevator moving the grain into a hopper storage system.

What is needed in the art is a cost effective way to move grain from a high capacity cleaning system to the hopper.

SUMMARY OF THE INVENTION

The present invention provides a cost effective way to move grain from the cleaning system to the hopper.

The invention comprises, in one form thereof, a harvesting machine including a frame, a plurality of ground engaging wheels, at least one grain separating section, a plurality of cross augers and a grain moving device. The plurality of ground engaging wheels support the frame. The at least one grain separating section is supported by the frame. The plurality of cross augers are positioned to receive grain from the at least one grain separating section. The plurality of cross augers each have an end. The grain moving device is associated with each of the plurality of cross augers proximate to the end of the plurality of cross augers.

DETAILED DESCRIPTION OF THE INVENTION

Figure 1:
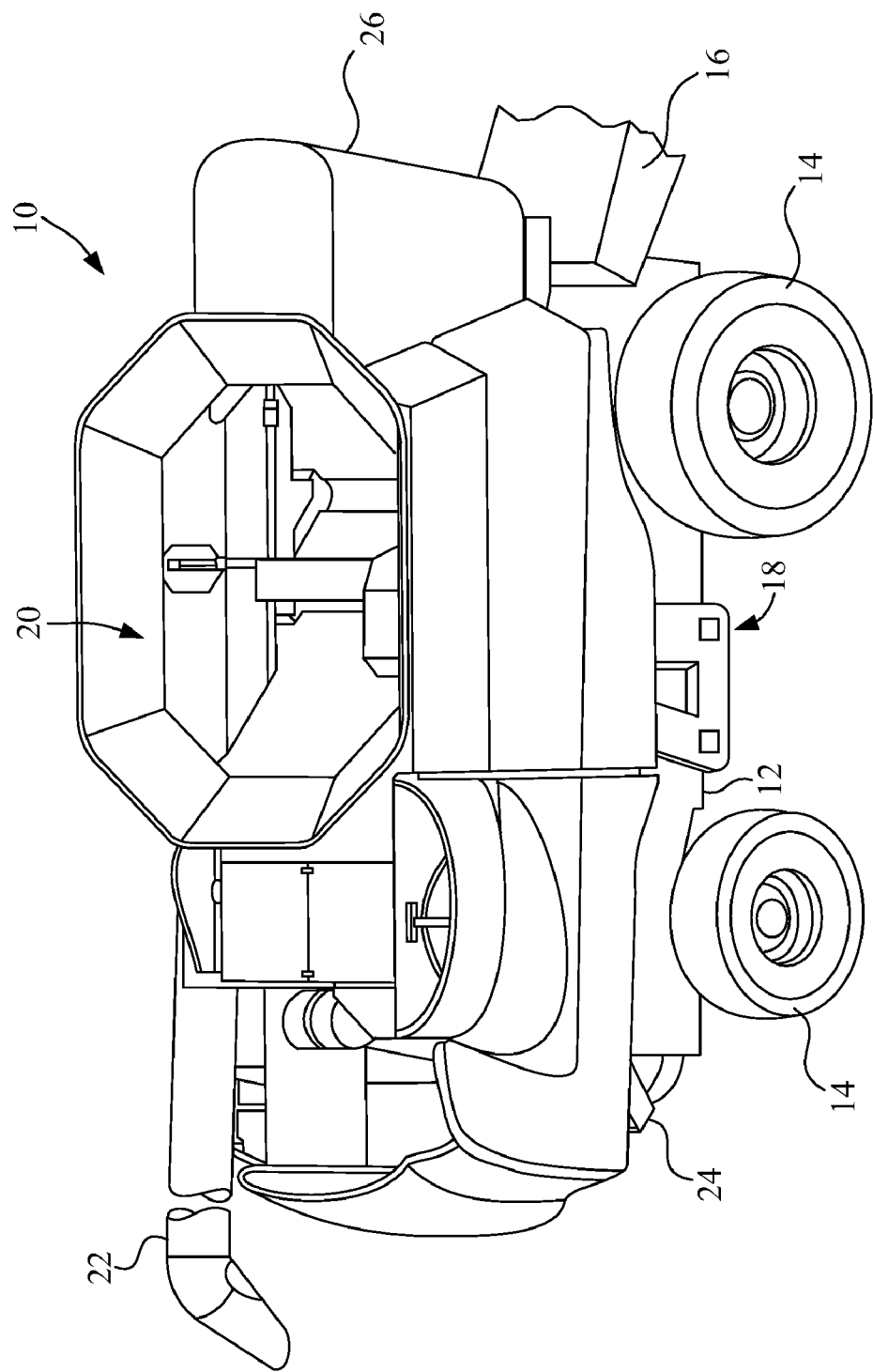
FIG. 1 is a perspective view of an agricultural combine including an embodiment of an elevator system of the present invention.
Figure 2:
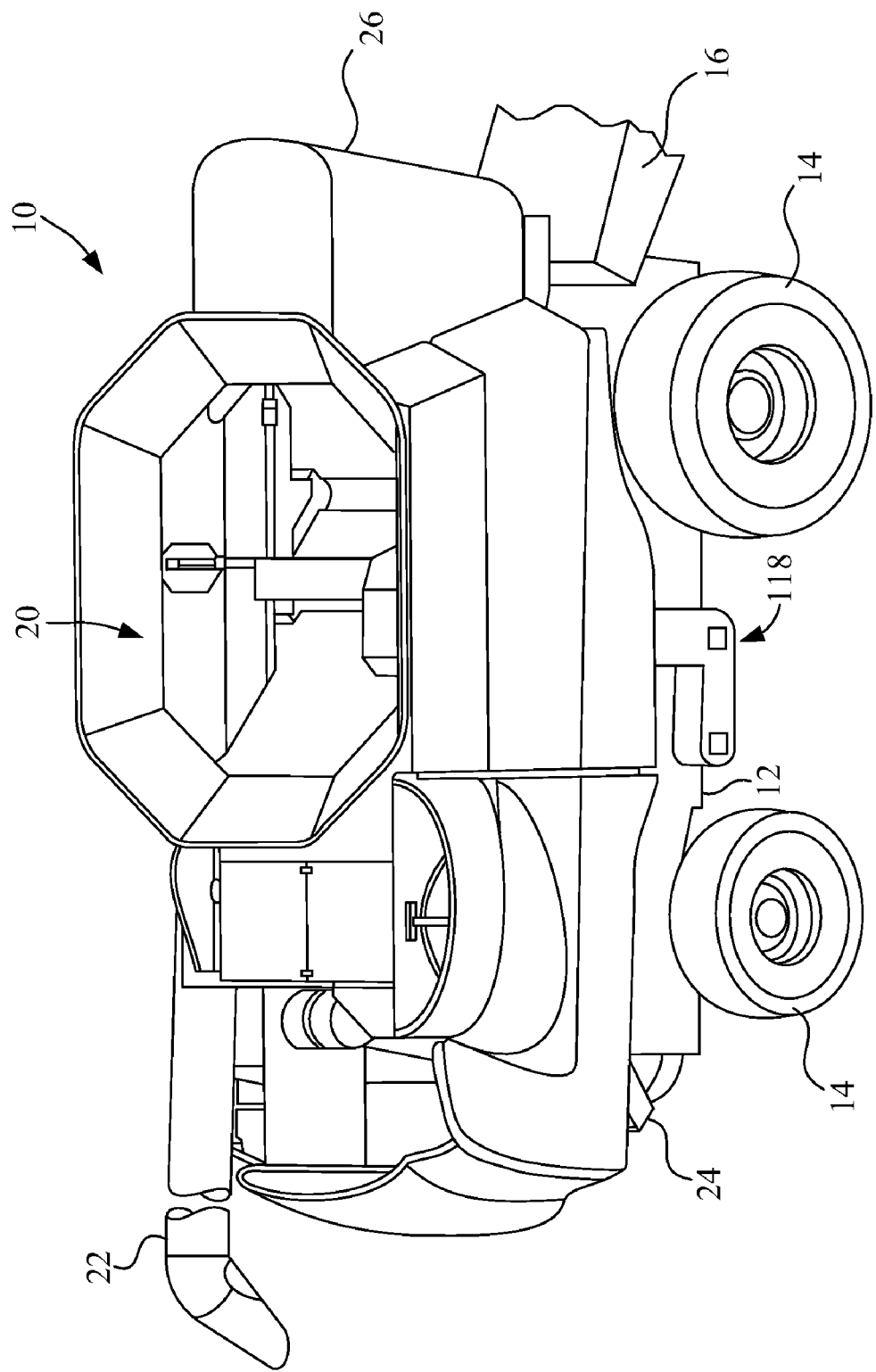
FIG. 2 is a perspective view of an agricultural combine including another embodiment of an elevator system of the present invention.

Referring now to the drawings, and more particularly to FIGS. 1 and 2, there is shown a working vehicle in the form of an agricultural harvesting machine, such as an agricultural combine 10. The working vehicle can also be in the form of a different type of vehicle using a grain separator and elevator system of the present invention.

Combine 10 includes a supporting structure or frame 12 having ground engaging wheels 14 extending from frame 12. Frame 12 provides structural strength for combine 10 and is supported by wheels 14. Frame 12 supports other elements of combine 10. Although combine 10 is illustrated as having wheels 14, combine 10 may also have ground engaging tracks, either full tracks or half-tracks. A harvesting platform (not shown), such as a soybean cutting platform or corn head is used for harvesting a crop and directing it to a feeder house 16. The harvested crop is directed by feeder house 16 to internal workings of combine 10, not specifically shown in FIGS. 1 and 2. The internal workings may include an axial crop processing unit, which threshes and separates the harvested crop material. Grain and chaff fall through grates below the crop processing unit to a cleaning system that removes the chaff and directs the clean grain to a grain handling system 18 or 118 that conveys the grain to grain hopper 20. The clean grain in hopper 20 is typically unloaded into a gravity wagon or truck using an unloading auger 22. The threshed and separated crop material, other than the grain, is transported by way of a discharge beater to a straw chopper 24, which chops and flails the non-grain material back to the field. The operation of combine 10 is controlled from an operator's cab 26.

Figure 3:
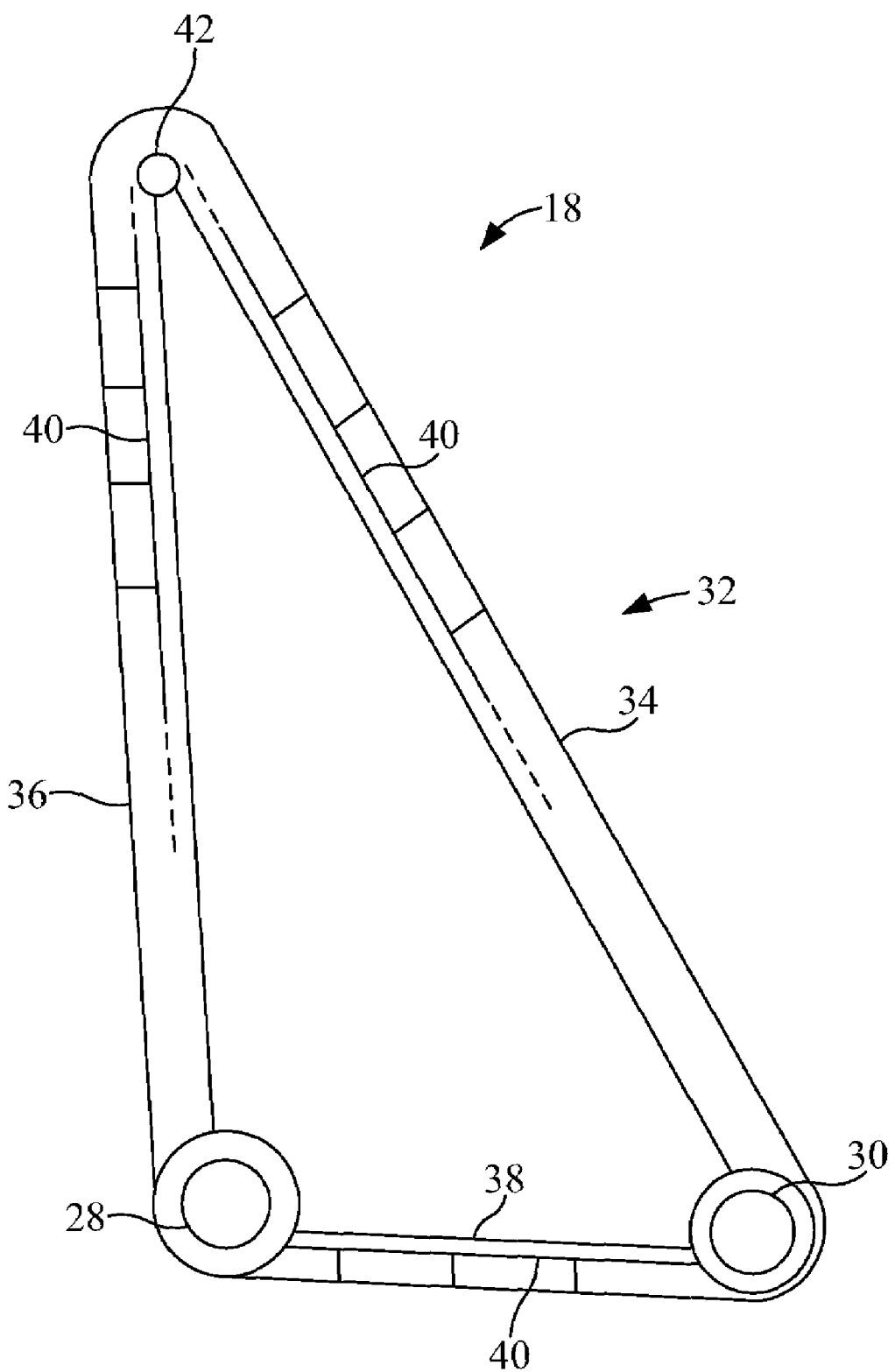
FIG. 3 is a schematized view of the elevator section of FIG. 1.

Now, additionally referring to FIG. 3, there is shown a grain handling system 18 including a cross auger 28, a cross auger 30, an elevator system 32 having elevator sections 34 and 36 along with a horizontal section 38. A circuitous element 40 moves within sections 34, 36 and 38 to move grain to a release point 42. Augers 28 and 30 set at the bottom of grain handling system 18 and convey grain that has been separated from the crop material and chaff at the side of the combine 10 so that elevator system 32 may move the clean grain to hopper 20. Release point 42, which may be in the form of a fountain auger 42 is adjacent to or within hopper 20 for the placing of grain therein. Augers 28 and 30 collect grain from different portions of a combine cleaning system that may be separated by a material flow channel. Unlike the prior art elevator systems, which move grain from a single point to a single point, grain handling system 18 collects and/or moves grain across horizontal section 38. Augers 28 and 30 move grain from a bottom portion of combine 10 to the side of combine 10 and although augers 28 and 30 may be the same size in diameter and may be rotated at the same speed, it is also contemplated that augers 28 and 30 may be differing diameters moving at different rotating velocities. Sprockets or pulleys are attached to the end of augers 28 and 30 to allow circuitous element 40 to receive motive power thereby. Circuitous element 40 may be in the form of a paddle chain 40 or a cleated belt 40. The axis about which auger 28 rotates is substantially parallel with the axis about which auger 30 rotates as well as the axis about which auger 42 rotates. The general orientation of these axes is substantially perpendicular to the normal direction that combine 10 travels. Circuitous element 40 is considered to be moving in a closed loop with the linear direction of travel changing direction as circuitous element 40 passes each auger 28, 30 and 42.

As can be seen in FIG. 3, sections 34 and 36 each have one end that meets proximate to release point 42 and opposite ends that are apart with section 34 being proximate auger 30 and section 36 having an end proximate auger 28.

Figure 4:
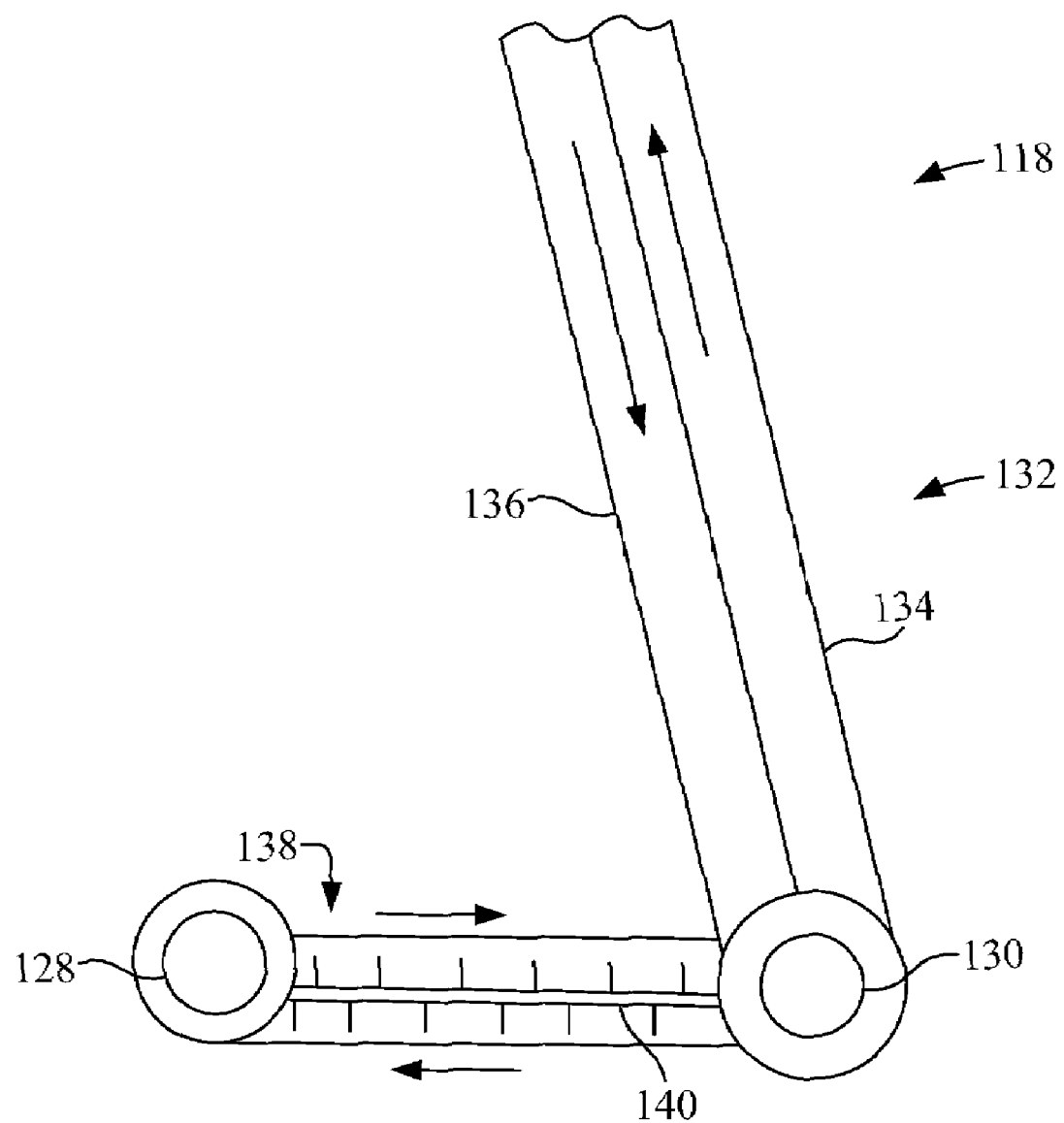
FIG. 4 is a partial schematized view of the elevator system of FIG. 2.

Now, additionally referring to FIG. 4 there is illustrated grain handling system 118 having elements substantially similar in description as those discussed above having 100 added to their numbers. In this embodiment horizontal section 138 includes a circuitous element 140 that has a closed loop circuitous path of travel moving between auger 128 and auger 130. Horizontal section 138 moves grain that has been moved to the end of auger 128 and delivers it to an area proximate the end of auger 130 so that elevator system 132 can move grain to hopper 20. In this embodiment elevator system 132 is substantially similar to those utilized the present combines. Circuitous element 130 can likewise be a paddle chain 140 or a cleated belt 140 that may be positioned to move about a sprocket associated with each of augers 128 and 130.

The present invention advantageously moves a larger amount of grain to the elevator than the prior art systems. Further, the present invention allows for the use of multiple cross augers for the accommodation of high capacity cleaning sections. This avoids the need for two separate clean grain elevators, and reduces the complexity of a grain handling system that serves two or more cross augers.

Having described the preferred embodiment, it will become apparent that various modifications can be made without departing from the scope of the invention as defined in the accompanying claims.

The invention claimed is:

1. A harvesting machine, comprising:
    a frame;
    a plurality of ground engaging wheels supporting said frame;
    at least one grain separating section supported by said frame;
    a plurality of cross augers positioned to receive grain from said at least one grain separating section, said plurality of cross augers each having an end;
    a grain moving device associated with each of said plurality of cross augers proximate said end of each of said plurality of cross augers, said grain moving device being a paddle chain;
    a hopper supported by said frame; and
    a clean grain elevator conveying grain to said hopper from a position proximate said end of at least one of said plurality of cross augers, said clean grain elevator includes a first section and a second section each having a first end and a second end, said first end of said first section and said first end of said second section being connected proximate to a release point where the grain enters said hopper, said second end of said first section and said second end of said second section being apart from each other.

2. The harvesting machine of claim 1, wherein said paddle chain is a closed loop changing direction as said paddle chain passes each of said plurality of cross augers.

3. The harvesting machine of claim 1, wherein said plurality of cross augers includes a first cross auger and a second cross auger, said paddle chain having a circuit that includes said end of said first cross auger and said end of said second cross auger, said first auger being associated with said second end of said first section, said second auger being associated with said second end of said second section.

4. The harvesting machine of claim 3, wherein said circuit of said paddle chain also includes said first section and said second section of said clean grain elevator.

5. The harvesting machine of claim 4, wherein said paddle chain is driven by at least one of said first cross auger and said second cross auger.

6. A grain handling system of a harvesting machine having at least one grain separation section, the grain handling system, comprising:
    a plurality of cross augers positioned to receive grain from the at least one grain separating section, said plurality of cross augers each having an end;
    a grain moving device associated with each of said plurality of cross augers proximate said end of each of said plurality of cross augers, said grain moving device being a paddle chain; and
    a clean grain elevator conveying grain to a release point from a position proximate said end of at least one of said plurality of cross augers, said clean grain elevator includes a first section and a second section each having a first end and a second end, said first end of said first section and said first end of said second section being connected proximate to said release point, said second end of said first section and said second end of said second section being apart from each other.

7. The grain handling system of claim 6, wherein said paddle chain is a closed loop changing direction as said paddle chain passes each of said plurality of cross augers.

8. The grain handling system of claim 6, wherein said plurality of cross augers includes a first cross auger and a second cross auger, said paddle chain having a circuit that includes said end of said first cross auger and said end of said second cross auger, said first auger being associated with said second end of said first section, said second auger being associated with said second end of said second section.

9. The grain handling system of claim 8, wherein said circuit of said paddle chain also includes said first section and said second section of said clean grain elevator.

10. The grain handling system of claim 9, wherein said paddle chain is driven by at least one of said first cross auger and said second cross auger.

* * * * *